No. 659,581. Patented Oct. 9, 1900.
A. M. COBURN.
MOTOR VEHICLE.
(Application filed Jan. 2, 1900.)

(No Model.) 3 Sheets—Sheet 3.

WITNESSES:
Edward Thorpe

INVENTOR
Avon M. Coburn
By
ATTORNEYS

UNITED STATES PATENT OFFICE.

AVON MENZOR COBURN, OF DAUNT, CALIFORNIA.

MOTOR-VEHICLE.

SPECIFICATION forming part of Letters Patent No. 659,581, dated October 9, 1900.

Application filed January 2, 1900. Serial No. 125. (No model.)

*To all whom it may concern:*

Be it known that I, AVON MENZOR COBURN, a citizen of the United States, and a resident of Daunt, in the county of Tulare and State of California, have invented a new and Improved Motor-Vehicle, of which the following is a full, clear, and exact description.

The object of the invention is to provide a new and improved motor-vehicle which is simple and durable in construction and arranged to permit of conveniently steering and reversing it and transmitting the power from the motor to the driving-wheels without jerk or jar to insure easy and comfortable riding in the vehicle.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
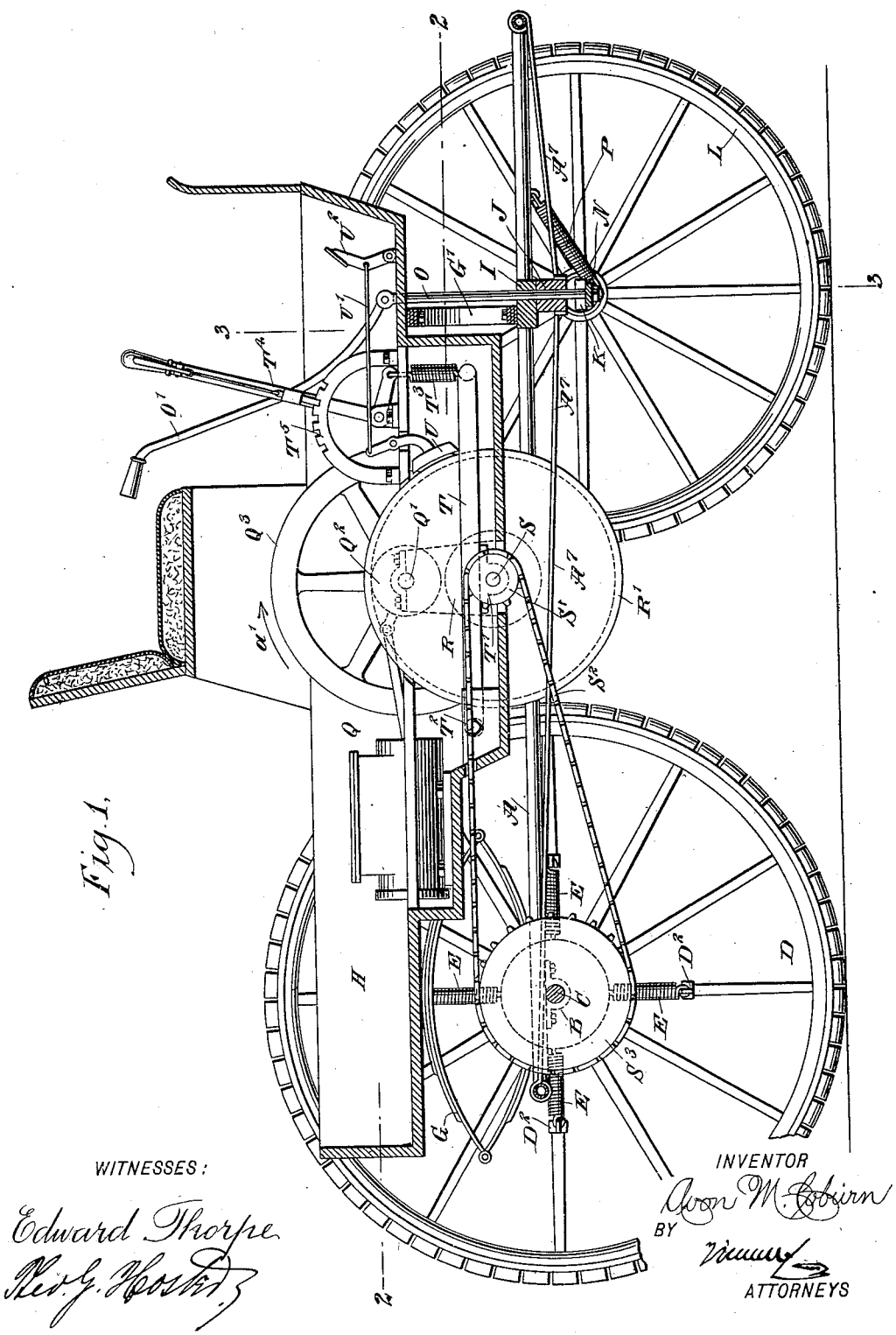
Figure 2:
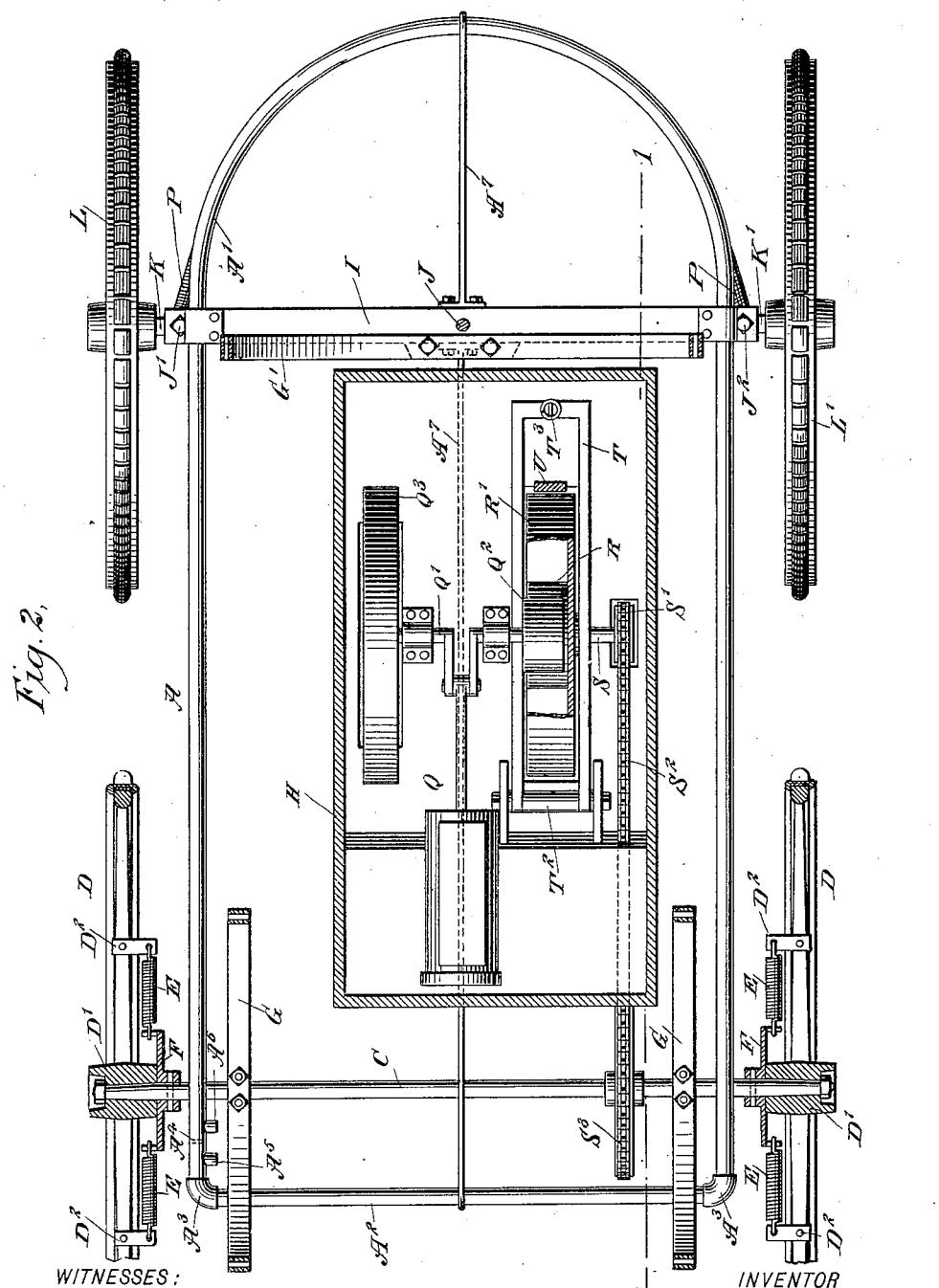
Figure 3:
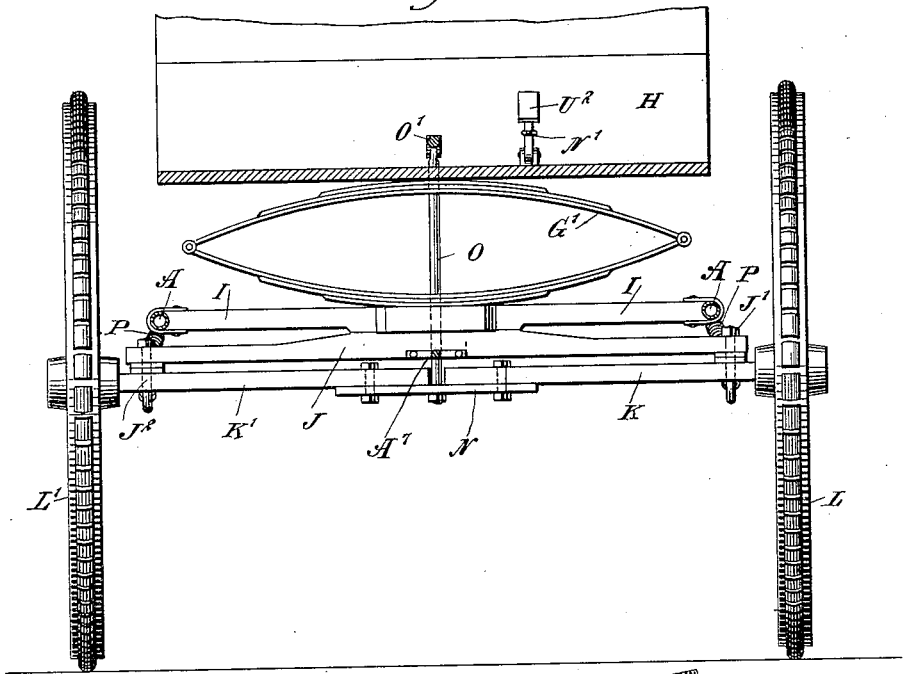
Figure 4:
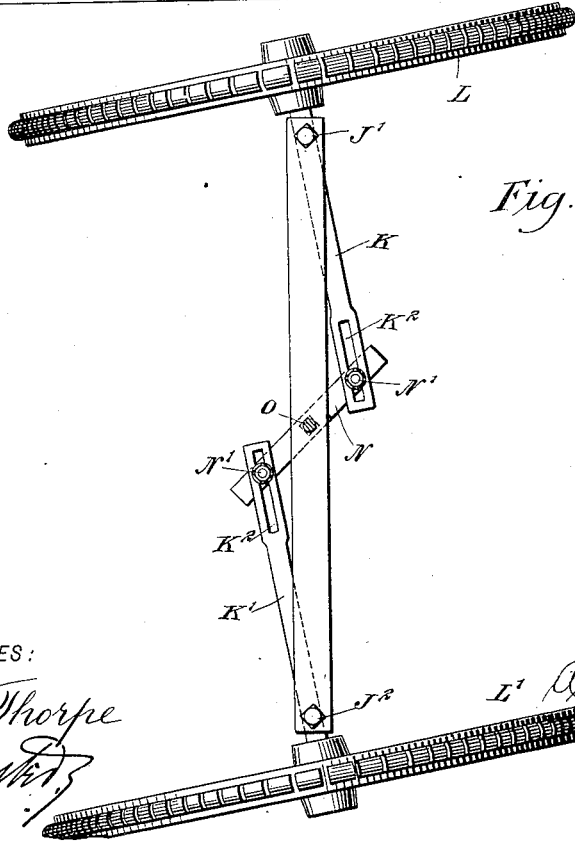

Figure 1 is a sectional side elevation of the improvement as applied to a road-wagon, the section being on the line 1 1 in Fig. 2. Fig. 2 is a sectional plan view of the same on the line 2 2 in Fig. 1. Fig. 3 is a transverse section of the same on the line 3 3 in Fig. 1, and Fig. 4 is a plan view of the divided axle with the wheels journaled thereon.

The improved motor-vehicle has a frame A, made of tubing and in sections A' A², of which the section A' is bent in U form, as is plainly shown in Fig. 2, so that the curved or middle portion forms the front end of the vehicle, and this curved portion projects sufficiently in front to form a fender for the vehicle. The section A² of the frame A is a cross-piece having right and left hand threads at the ends to simultaneously screw in elbows A³ on the rear ends of the section A' to complete the frame. One of the sides of the section A' is provided with a transverse partition A⁴, and inlets and outlets A⁵ A⁶ are arranged on opposite sides of the partition to connect by flexible tubes or other means with a pump or like device for circulating the water employed to cool the cylinder of the motor through the frame-sections, so that the water is cooled and returns in this cooled condition to the water-jacket of the cylinder.

On the side arms of the section A' and near the rear end of the said section are secured bearings B, in which is mounted to turn the rear shaft or axle C, on the outer ends of which are mounted to rotate loosely the hubs D' of the rear or driving wheels D, adapted to travel on the ground. On some of the spokes of each of the driving-wheels are secured clips D², connected by springs E with a disk F, secured on the axle or shaft C adjacent to the corresponding hub D' of the driving-wheel D, so that when the shaft C is rotated the disks F' rotate with it and by the springs E carry around the driving-wheels, it being understood that said springs form a yielding connection between the disks F and the driving-wheels, so that when the shaft C begins to turn upon starting the vehicle the disks F pull on the springs E and gradually open the same until the tension of the springs is sufficient to cause the wheels D to rotate, so that the vehicle is started without jar or jerk, and consequently easy and comfortable riding in the vehicle is assured.

On the rear ends of the section A' of the frame are secured elliptical longitudinally-extending springs G, connected with the under side of the vehicle-body H at the rear thereof, and the front end of said vehicle-body rests at its middle on a transversely-extending elliptical spring G', secured at its bottom to a bolster I, secured at its ends to the side bars of the section A', as is plainly indicated in Figs. 2 and 3. The bolster I rests on the top of a false axle J, carrying at its ends pivots J' J², on which are mounted to swing the parts K K' of a divided axle, the outer ends of the parts being formed with journals on which turn the front or steering wheels L L'. The inner ends of the axle parts K K' are formed with slots K², (see Fig. 4,) engaged by pins N', held on an arm N, secured at its middle on a shaft O, extending vertically and mounted to turn in the false axle J, the bolster I, and the bottom of the vehicle-body H, as is plainly indicated in the drawings.

On the upper end of the shaft O is pivoted a handle O', adapted to be taken hold of by the operator seated in the vehicle-body H to impart a turning motion to the shaft O, so as to swing the arm N and impart a swinging motion to the parts K K' of the divided axle, so that the wheels L L' are swung into a normal position either to the right or to the left, according to the direction in which the vehicle is to be steered. The handle O' normally stands at a right angle relatively to the arm N, so that the divided-axle parts K K' are in transverse alinement with each other and directly under the false axle J, and when it is desired to steer the vehicle to the left the operator swings the handle O' to the right to bring the arm N into the position shown in Fig. 4. The lower ends of the pivots J' J² are formed into eyes connected by springs P with the forward end of the frame-section A', so that the false axle J is normally held in proper transverse position, but is somewhat free to yield in case undue strain is exerted by the wheels L L' passing over uneven ground.

The motor Q is located in the vehicle-body H and may be of any approved construction. The main shaft Q' carries a pulley Q², adapted to engage either the wheel R externally or the wheel R' internally, as will be readily understood by reference to Fig. 1. The wheels R and R' are concentric to each other and are secured on a counter-shaft S, journaled in bearings T', secured to a lever T, fulcrumed at T² to the vehicle-body and connected at its free end by a spring T³ with a lever T⁴ under the control of the operator and adapted to be locked to a notched segment T⁵ in the usual manner.

On the shaft S is secured a sprocket-wheel S', connected by a sprocket-chain S² with a sprocket-wheel S³, secured on the axle or shaft C. When it is desired to drive the vehicle forward, the lever T⁴ is held in the position shown in Fig. 1, so that the lever T holds the wheel R' in frictional contact with the wheel Q², and when the motor is now actuated a rotary motion is transmitted by the wheel Q² to the wheel R' to turn the latter in the direction of the arrow a'. The rotary motion of the wheel R' is transmitted by the sprocket-wheels S' S³ and the sprocket-chain S² to the axle C, and the rotary motion of the latter is yieldingly transmitted by the disks F and springs E to the driving-wheels D, as above explained, so that the vehicle is propelled forward. When it is desired to stop the vehicle, the lever T⁴ is moved to a central position, at which point, although the engine is running at full speed, no transmission of power takes place, and upon moving the lever still farther rearward and causing the wheel R to mesh with the wheel Q² a backward motion is obtained which is faster than the forward motion; but by reversing the engine the faster gear may be used for going ahead and the slower for backing.

In order to brake the vehicle, a brake-shoe U is adapted to engage externally the rim of the wheel R', and this shoe U is fulcrumed on the vehicle-body and is connected by a link U' with a foot-lever U², fulcrumed on the vehicle-body and adapted to be actuated by the foot of the operator. Thus when the lever U² is pressed forward the brake-shoe U is moved in contact with the wheel R', and consequently the latter is braked. It is understood that as both wheels R R' are secured on the same shaft S the wheel R' is rotated whether it or the other wheel R engages with the wheel Q². On the end of the shaft is secured a fly-wheel Q³ for steadying the rotary motion of the shaft Q'.

In order to strengthen the frame A, truss-rods A⁷ are connected with the front end of the section A' and the rear section A², and said truss-rods A⁷ are attached to the front and rear faces of the false axle J, as is plainly indicated in Fig. 1.

Having thus fully described my invention, I claim as new and desire to secure by Letters Patent—

1. A motor-vehicle having a driving-gear, comprising a shaft rotated from the motor, a driving-wheel thereon, a counter-shaft, two wheels on the counter-shaft and adapted to be driven in either direction from the said drive-wheel, said wheels being of different diameters and concentric to each other and a lever under the control of the operator and carrying the bearings for the said counter-shaft, to move the said wheels in or out of contact with the drive-wheel, substantially as shown and described.

2. A motor-vehicle having a driving-gear, comprising a shaft rotated from the motor, a driving-wheel thereon, a counter-shaft, two wheels on the counter-shaft and adapted to be driven in either direction from said drive-wheel, said wheels being of different diameters and concentric to each other, a lever under the control of the operator and carrying bearings for the said counter-shaft, to move the said wheels in or out of contact with the drive-wheel, a hand-lever, and a spring interposed between the free end of the first-named lever and the hand-lever, substantially as shown and described.

3. A motor-vehicle having a driving-gear, comprising a shaft rotated from the motor, a driving-wheel thereon, a counter-shaft, two wheels on the counter-shaft and adapted to be driven in either direction by said drive-wheel, said wheels being of different diameters and concentric to each other, a lever under the control of the operator and carrying bearings for the said counter-shaft, to move the said wheels in or out of contact with the drive-wheel, and a brake for engagement with the larger wheel, substantially as shown and described.

4. A motor-vehicle, comprising a frame, a rear axle journaled on the frame and carrying the rear or drive wheels, a front axle made in parts each carrying a wheel, a false axle on which the front-axle parts are fulcrumed, a steering-shaft mounted to turn in the false axle and provided at its lower end with an arm loosely connected with the inner ends of the said front-axle parts, and a bolster carried by the said false axle and connected with the said frame, substantially as shown and described.

5. A motor-vehicle, comprising a frame, a rear axle journaled on the frame and carrying the rear or drive wheels, a front axle made in parts each carrying a wheel, a false axle on which the front-axle parts are fulcrumed, a steering-shaft mounted to turn in the false axle and provided at its lower end with an arm loosely connected with the inner ends of the said front-axle parts, a bolster carried by the said false axle and connected with the said frame, and a spring connection between the false axle and said frame, substantially as shown and described.

6. A motor-vehicle having a steering-gear comprising a steering-axle made in parts each carrying a wheel at its outer end and having their inner ends slotted, a false axle on which said axle parts are independently fulcrumed, and a steering-shaft under the control of the operator and having arms provided with pins engaging the slotted ends of the said axle parts, substantially as shown and described.

7. A motor-vehicle having a steering-gear comprising a steering-axle made in parts each carrying a wheel at its outer end, a false axle on which said axle parts are independently fulcrumed, a steering-shaft under the control of the operator and having arms connected with the inner ends of the said axle parts, and a bolster carried by the vehicle-frame, the bolster resting on said false axle, and said steering-shaft forming the king-bolt for the bolster, substantially as shown and described.

8. A motor-vehicle, comprising an axle, drive-wheels mounted loosely on the axle, provided with a sprocket-wheel, a motor, a shaft driven from the motor, a wheel on said shaft, a counter-shaft, two wheels on the counter-shaft, said wheels being of different diameters and concentric to each other, a sprocket-wheel on said counter-shaft, a pivoted lever carrying the bearings for the counter-shaft, an operating-lever connected with the free end of the said pivoted lever, and a belt passing over the sprocket-wheels of the axle and counter-shaft, substantially as described.

9. A motor-vehicle, comprising an axle, drive-wheels loosely mounted on the axle, a yielding connection between the drive-wheels and axle, a motor, a shaft driven from the motor, a wheel on said shaft, a counter-shaft, two wheels mounted on the counter-shaft, said wheels being of different diameters and concentric to each other, a pivoted lever carrying the bearings for the counter-shaft, means for swinging said lever on its pivot, and means for operating the axle from the counter-shaft, substantially as described.

In testimony whereof I have signed my name to this specification in the presence of two subscribing witnesses.

AVON MENZOR COBURN.

Witnesses:
LOUIS WEBER,
H. F. BREY.